US010552866B2

(12) United States Patent
Muppirala et al.

(10) Patent No.: US 10,552,866 B2
(45) Date of Patent: Feb. 4, 2020

(54) INTELLIGENT CONTENT AND NAVIGATION

(71) Applicant: Staples, Inc., Framingham, MA (US)

(72) Inventors: Prakash Muppirala, Lexington, MA (US); Faisal Masud, Boston, MA (US); Arun Arora, Chicago, IL (US); Pratabkumar Vemana, Westborough, MA (US); Melanie Oxley-Wilson, Morden (GB); Debra Arora, Morden (GB)

(73) Assignee: Staples, Inc., Framingham, MA (US)

( * ) Notice: Subject to any disclaimer, the term of this patent is extended or adjusted under 35 U.S.C. 154(b) by 390 days.

(21) Appl. No.: 14/517,613

(22) Filed: Oct. 17, 2014

(65) Prior Publication Data

US 2015/0112807 A1    Apr. 23, 2015

Related U.S. Application Data

(60) Provisional application No. 61/892,356, filed on Oct. 17, 2013.

(51) Int. Cl.
*G06Q 30/00* (2012.01)
*G06Q 30/02* (2012.01)
*G06F 16/958* (2019.01)

(52) U.S. Cl.
CPC ....... *G06Q 30/0251* (2013.01); *G06F 16/958* (2019.01); *G06Q 30/0258* (2013.01)

(58) Field of Classification Search
None
See application file for complete search history.

(56) References Cited

U.S. PATENT DOCUMENTS

| | | | |
|---|---|---|---|
| 6,188,407 B1 * | 2/2001 | Smith | A61B 5/044 715/841 |
| 7,698,173 B1 * | 4/2010 | Burge | G06Q 30/02 705/26.5 |
| 9,329,759 B1 * | 5/2016 | Hill | G06F 3/04842 |
| 2005/0222919 A1 * | 10/2005 | Pellerin | G06Q 30/0641 705/27.1 |
| 2007/0061851 A1 * | 3/2007 | Deshpande | A63F 13/00 725/88 |
| 2007/0214150 A1 * | 9/2007 | Chace | G06F 17/30902 |
| 2010/0228632 A1 * | 9/2010 | Rodriguez | G06F 3/011 705/14.66 |

(Continued)

*Primary Examiner* — Meredith A Long
(74) *Attorney, Agent, or Firm* — Patent Law Works LLP

(57) ABSTRACT

The disclosure includes technology for providing custom content for display. In an example embodiment, a computer-implemented method includes storing unique customer types in a non-transitory computer storage device; storing in the computer storage device custom contents in association with one or more of the different customer types; receiving at a user device or a server coupled to the user device interaction data from the user device of a user describing an interaction by the user with a site presented for display to the user on the user device; determining by the user device or the server a customer type for the user; querying by the user device or the server the custom contents stored on the computer storage device for a custom content matching the customer type and associated with the interaction data; and presenting the custom content to the user via the display of the user device.

19 Claims, 14 Drawing Sheets

(56) References Cited

U.S. PATENT DOCUMENTS

| | | | | |
|---|---|---|---|---|
| 2011/0191666 A1* | 8/2011 | Decker | ............... | G06F 3/14 |
| | | | | 715/234 |
| 2013/0024811 A1* | 1/2013 | Gleadall | ............ | G06F 3/0482 |
| | | | | 715/810 |
| 2013/0076756 A1* | 3/2013 | Pritting | ............ | G06T 13/00 |
| | | | | 345/473 |
| 2013/0274007 A1* | 10/2013 | Hilbert | ............ | A63F 13/00 |
| | | | | 463/29 |
| 2015/0046841 A1* | 2/2015 | Sharon | ............ | G06Q 50/01 |
| | | | | 715/753 |

* cited by examiner

406

INTELLIGENT CONTENT AND NAVIGATION

CROSS-REFERENCE TO RELATED APPLICATIONS

This application claims the benefit under 35 U.S.C. § 119(e) of U.S. Provisional Patent Application No. 61/892,356, entitled "Intelligent Navigation Including Screen Animation" and filed Oct. 17, 2013, which is incorporated herein by reference in its entirety.

BACKGROUND

The specification relates to online navigation on a site. In particular, the specification relates to a system and method for providing animated navigation on a dynamic screen.

Existing technologies use hypertext markup language (HTML) to create content to be displayed on web pages. For example, the content may be displayed as static information on the web pages. The web pages cannot show motion or movement of the content, even if an illustration of movement of the content can produce a more dynamic navigation experience. In addition, while various JavaScript libraries exist that allow developers to apply dynamic effects to HTML elements, these effects are not personalized to the users, nor are they generated in association with customized content, but are broadly applicable to all users.

SUMMARY

According to one innovative aspect of the subject matter described in this disclosure, a computer-implemented method includes storing unique customer types in a non-transitory computer storage device; storing in the computer storage device custom contents in association with one or more of the different customer types; receiving at a user device or a server coupled to the user device interaction data from the user device of a user describing an interaction by the user with a site presented for display to the user on the user device; determining by the user device or the server a customer type for the user; querying by the user device or the server the custom contents stored on the computer storage device for a custom content matching the customer type and associated with the interaction data; and presenting the custom content to the user via the display of the user device.

In general, another innovative aspect of the subject matter described in this disclosure may be embodied in a system including one or more processors; one or more memories and a non-transitory computer storage device. The one or more memories store computer logic executable by the one or more processors. The non-transitory computer storage device stores unique customer types and contents in association with one or more of the different customer types. The system further includes a communication module executable by the one or more processors to receive interaction data from a user device of a user describing an interaction by the user with a site presented for display to the user on the user device; a user identification module executable by the one or more processors to determine a customer type for the user; a content customization module executable by the one or more processors to generate one or more customized contents by matching the customer type associated with the interaction data to one or more of the contents stored in the computer storage device, the content customization module coupled to the communication module or the non-transitory computer storage device to receive the interaction data and coupled to the user identification module or the non-transitory computer storage device to receive the customer type; and a presentation module executable by the one or more processors to present the one or more customized contents to the user via the display of the user device.

In general, another innovative aspect of the subject matter described in this disclosure may be embodied in a system for providing animated navigation on a dynamic screen that includes a processor and a memory storing instructions when executed cause the system to: receive data describing a user interaction on a site; identify the user; create customized content(s) for the user; generate an animation including one or more animation frames based on the customized content(s); and present the animation to the user.

Other aspects include corresponding methods, systems, apparatus, and computer program products for these and other innovative aspects. Further advantages and benefits of the technology described herein are provided throughout this disclosure.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Overview

Figure 1:
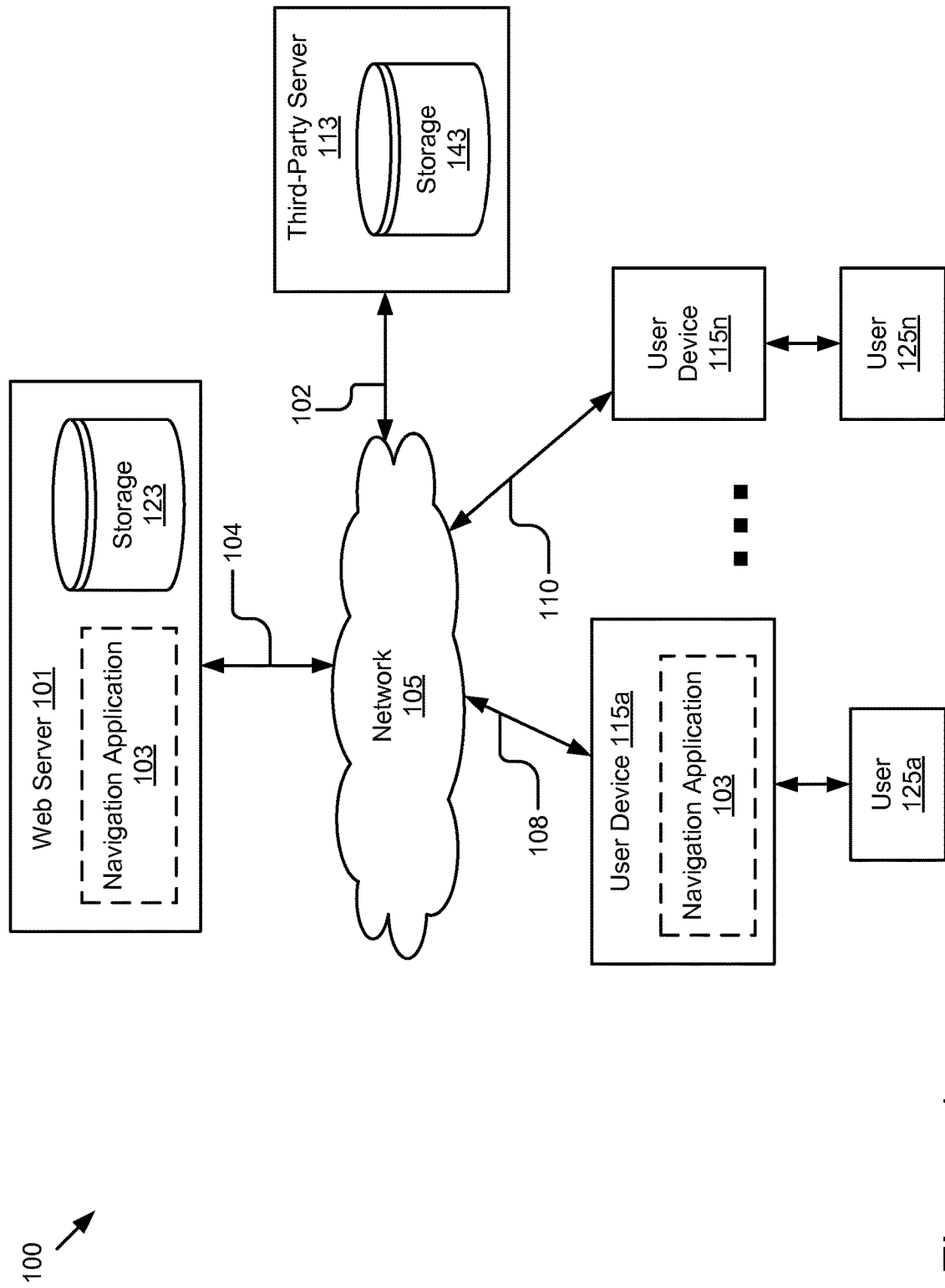
FIG. 1 is a block diagram illustrating an example system for providing animated navigation on a dynamic screen according to some implementations.

FIG. 1 illustrates a block diagram of some implementations of a system 100 for providing animated navigation on a dynamic screen. The illustrated system 100 includes a web server 101, a third-party server 113, and one or more user devices 115a . . . 115n that can be accessed by one or more users 125a . . . 125n. In FIG. 1 and the remaining figures, a letter after a reference number, e.g., "115a", represents a reference to the element having that particular reference number. A reference number in the text without a following letter, e.g., "115", represents a general reference to implementations of the element bearing that reference number. In the illustrated implementation, these entities of the system 100 are communicatively coupled via a network 105. While FIG. 1 illustrates two user devices 115a, 115n, one web server 101, and one third-party server 113, the disclosure applies to a system architecture having one or more user devices 115, one or more web servers 10, one or more third-party servers 113, and/or other computing components. Furthermore, although FIG. 1 illustrates one network 105 coupled to the user devices 115a, 115n, the third-party server 113, and the web server 101, in practice one or more networks 105 can be connected to these entities.

The network 105 can be a conventional type, wired and/or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, email, etc.

In some implementations, the navigation application 103 can be operable on a web server 101, which is connected to the network 105 via signal line 104. The web server 101 can be a hardware server that includes a processor, a memory, and network communication capabilities. In some implementations, the web server 101 sends and receives data to and from the third-party server 113 and the user devices 115 via the network 105. For example, the web server 101 retrieves content associated with a site (e.g., web page or other site) from a storage 143 in the third-party server 113, generates customized content(s) for a user based on the retrieved content, and sends the customized content(s) to a user device 115 for presenting the customized content(s) to a user.

A site is an application interface, such as a website, mobile site, or other portal, the user interacts with to browse and/or purchase various products and/or services (collectively referred to herein as simply products). This application interface is sometimes referred to herein as a dynamic screen, as it is dynamically customized/personalized to the user with customized content(s) and/or animation(s). Customized content(s) means content that is personalized to the user accessing the site. When customizing content, subject matter of the content may be customized to the user and/or the presentational aspects of the content may be customized to the user. In an example, the navigation application 103 may dynamically determine, based on attributes associated with the user, which products to present the user and/or whether discounts for those products or other products should be provided. In a further example, the navigation application 103 may dynamically determine the animation, layout, orientation, size, and/or color, etc., of the items displayed on the site to the user based on attributes associated with the user. For instance, the navigation application 103 may dynamically determine the makeup of navigational interface elements of the site, such as toolbars, menus, button placement, image placement, etc. In another example, the navigation application 103 may order and/or reorder based on user-related data, etc. Numerous other variations are also possible as discussed elsewhere herein. Non-limiting examples of interfaces including such dynamic content are provided in FIGS. 10A-11B.

In the illustrated implementation, the web server 101 includes a storage device 123. The storage device 123 can be a non-transitory memory that stores data for providing the acts and/or functionality described herein. The storage device 123 may include a dynamic random access memory (DRAM) device, a static random access memory (SRAM) device, flash memory, or some other memory devices. In some implementations, the storage device 123 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage device 123 stores data describing one or more of user accounts, user profiles, Internet Protocol (IP) addresses, hardware identifiers (IDs) such as hardware addresses of different user devices 115, user activities, customized content(s), etc., associated with different users with permissions from the users. In some implementations, the storage device 123 stores animation frames that present customized content(s) to users as an animation. The storage device 123 may store other data for providing the acts and/or functionality described herein.

In some implementations, the navigation application 103 can be operable on a user device 115a, which is connected to the network 105 via signal line 108. The user devices 115a . . . 115n may include computing devices that having a memory and a processor, for example a laptop computer, a desktop computer, a tablet computer, a mobile telephone, a personal digital assistant (PDA), a mobile email device, a portable game player, a game controller, a portable music player or other electronic device capable of accessing a network 105. In the illustrated implementation, the user 125a interacts with the user device 115a. The user 125n interacts with the user device 115n, which is communicatively coupled to the network 105 via signal line 110.

In some implementations, the navigation application 103 is a distributed application. For instance, the navigation application 103 may act in part as a thin-client application that may be stored on the user devices 115a, 115n and in part that may be stored on the web server 101. For example, component(s) of the navigation application 103 operable by the web server 101 generate one or more animation frames and sends the one or more animation frames to components(s) of the navigation application 103 stored on the user device 115a, causing the user device 115a to present the one or more animation frames on a display device (not shown) coupled to the user device 115a. In another example, components of the navigation application 103 residing on the user device 115a may generate the animation frames based on data received from components of the navigation application 103 residing on the web server 101. In some instances, the navigation application 103 may include a web application configured to server web pages to the user devices 115, which receive and render the web pages for display. In some instances, the navigation application 103 may include a native mobile app configured to receive dynamic data from a data service embodied by a server side components of the navigation application 103 and render that data for display. Numerous other implementations are also possible and contemplated.

The navigation application 103 can be code and routines for providing animated navigation on a dynamic screen. In some implementations, the navigation application 103 can be implemented using hardware including a field-programmable gate array (FPGA) or an application-specific integrated circuit (ASIC). In some other implementations, the navigation application 103 can be implemented using a combination of hardware and software. In some implementations, the navigation application 103 may be stored in a combination of the devices and servers, or in one of the devices or servers. The navigation application 103 is described below in more detail with reference to at least FIGS. 2-9.

A dynamic screen can include a data screen that provides dynamic information to a user. For example, a dynamic screen uses customized content(s) and/or animation(s) to provide information to users. A user can interact with any item displayed on a dynamic screen. In another example, a dynamic screen uses animations to illustrate how content of web pages appears on the dynamic screen and/or disappears from the dynamic screen, where a user can interact with any item displayed on the web pages. For example, if the user clicks on or uses a mouse to hover over an item (such as a menu in a navigation bar or other items such as a banner, etc.), an animation associated with the item is displayed to the user. Other example dynamic screens are possible.

Example items displayed on a page include, but are not limited to, a menu in a navigation bar, a product category, a service category, a particular product, a particular service, an image, a link, a banner, a button, or any other item on a page. Example user interactions include, but are not limited to, selecting an item (e.g., clicking on an item, tapping on an item), using a mouse to hover over an item, pointing at an item using a pointer or a finger/touchscreen, etc.

The third-party server 113 can include a hardware server that includes a processor, a memory, and network communication capabilities. The third-party server 113 is communicatively coupled to the network 105 via signal line 102. In some implementations, the third-party server 113 sends and receives data to and from the web server 101 and the user devices 115 via the network 105. For example, the third-party server 113 retrieves content associated with one or more products (e.g., product images, product videos, description for products, etc.) from the storage 143 and sends the retrieved content to the web server 101.

In the illustrated implementation, the third-party server 113 includes a storage device 143. The storage device 143 may store content describing one or more products such as product images, product videos, description for products, etc. The storage device 143 may store other data for providing the acts and/or functionality described herein. The storage device 143 can include a non-transitory memory that stores data for providing the acts and/or functionality described herein. The storage device 143 may include a dynamic random access memory (DRAM) device, a static random access memory (SRAM) device, flash memory, or some other memory devices. In some implementations, the storage device 143 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Navigation Application

Figure 2:
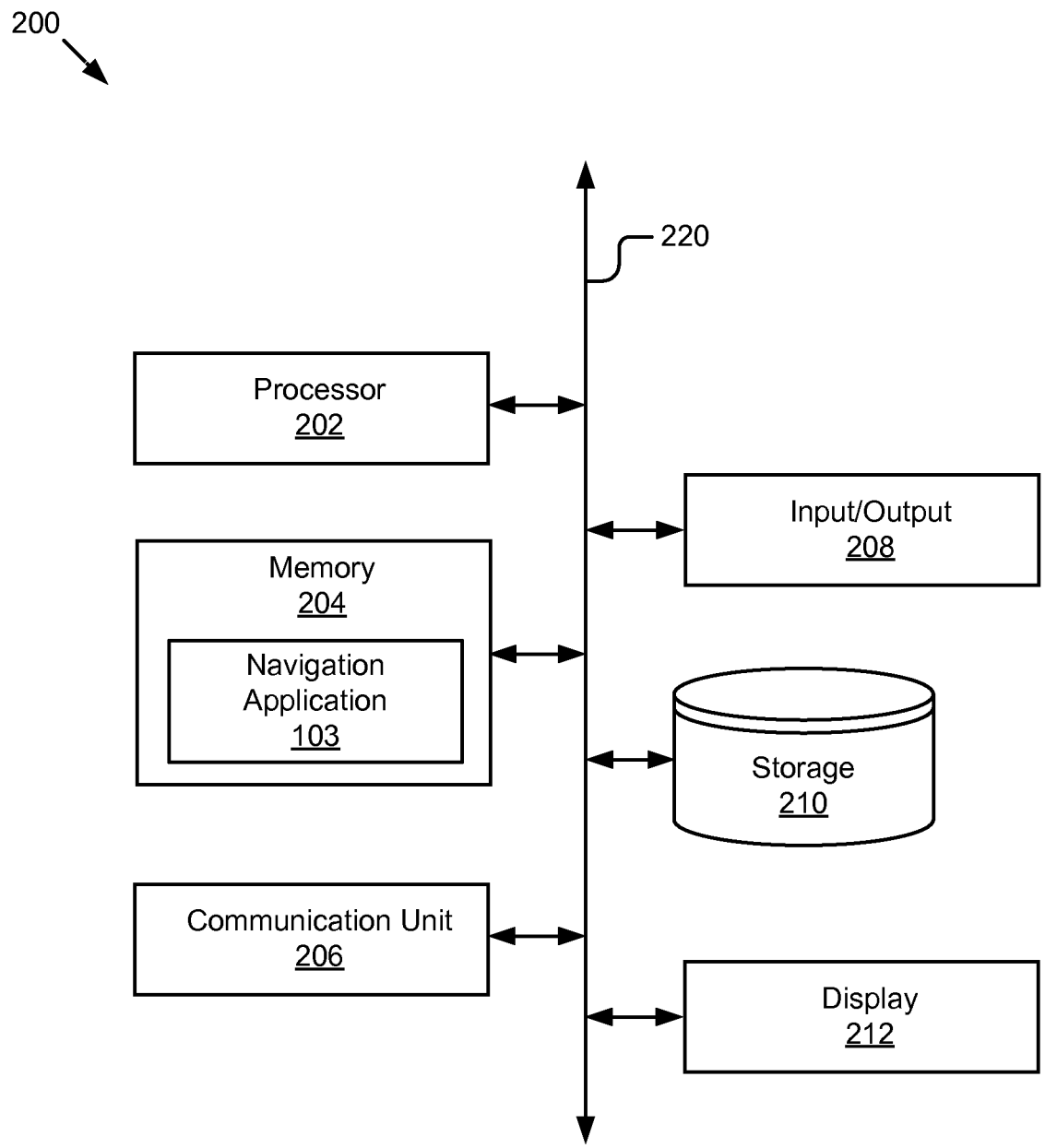
FIG. 2 is a block diagram illustrating an example-computing device including a memory that stores an example navigation application according to some implementations.

Referring to FIG. 2, an example computing device 200 including a memory 204 that stores an example navigation application 103 is shown in more detail. FIG. 2 is a block diagram illustrating an example computing device 200 that includes a processor 202, a memory 204, a communication unit 206, an input/output device 208, a display device 212, and a storage device 210 according to some examples. The components of the computing device 200 are communicatively coupled by a bus 220. In some implementations, the computing device 200 can include a web server 101. In some implementations, the computing device 200 can include a user device 115. The computing device 200 may be representative of a single computing device or multiple computing devices or systems. Accordingly, the processor 202, memory 204, and other components thereof may represent single or multiple devices electronically coupled for communication and interaction.

The processor 202 includes an arithmetic logic unit, a microprocessor, a general-purpose controller, or some other processor array to perform computations and provide electronic display signals to a display device. Processor 202 processes data signals and may include various computing architectures including a complex instruction set computer (CISC) architecture, a reduced instruction set computer (RISC) architecture, or an architecture implementing a combination of instruction sets. Although FIG. 2 includes a single processor 202, multiple processors 202 may be included. Other processors, operating systems, sensors, displays and physical configurations are possible.

The memory 204 is a non-transitory storage medium that stores instructions and/or data that may be executed by the processor 202. The instructions and/or data may include code for performing the techniques described herein. The memory 204 may include a dynamic random access memory (DRAM) device, a static random access memory (SRAM) device, flash memory, or some other memory device. In some implementations, the memory 204 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 206 transmits and receives data to and from the web server 101 or user device 115 depending upon where the navigation application 103 is stored. In some implementations, the communication unit 206 includes a port for direct physical connection to the network 105 or to another communication channel. For example, the communication unit 206 includes a USB, SD, CAT-5 or similar port for wired communication with the web server 101 or user device 115. In some implementations, the communication unit 206 includes a wireless transceiver for exchanging data with the web server 101 or other communication channels using one or more wireless communication methods, including IEEE 802.11, IEEE 802.16, BLUETOOTH® or another suitable wireless communication method.

In some implementations, the communication unit 206 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 206 includes a wired port and a wireless transceiver. The communication unit 206 also provides other conventional connections to the network 105 for distribution of files and/or media objects using standard network protocols including TCP/IP, HTTP, HTTPS, and SMTP, etc.

The storage device 210 is a non-transitory memory that stores data for providing the acts and/or functionality described herein. The storage device 210 may include a dynamic random access memory (DRAM) device, a static random access memory (SRAM) device, flash memory, or some other memory devices. In some implementations, the storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 210 may be incorporated with the memory 204 or distinct therefrom. The storage device 210 may store data in association with a database management system (DBMS) executable by the computing device 200. For instance, the DBMS could include a structured query language (SQL) DBMS, a NoSQL DMBS, various combinations thereof, a flat file database, etc. In some instances, the DBMS may store data in multi-dimensional tables comprised of rows and columns, and manipulate (e.g., insert, query, update and/or delete) rows of data using programmatic operations, although other implementations are also possible and contemplated.

While the storage device 210 is depicted as a monolithic entity, it should be understood that the database may reflect a plurality of information sources (e.g., databases, servers, applications, file systems, DBMSs, memory, etc.) configured to provide the contents. For instance, in some cases, the contents may be provided from a local cache, file system, and/or cloud-based applications embodying various services, such as those described elsewhere herein. In some cases, the contents may be accessed using applicable APIs.

In some implementations, the storage device 210 stores data describing one or more of customer types, user accounts, user profiles, user device types, Internet Protocol (IP) addresses, hardware addresses of different user devices 115, user activities, contents, mappings between the foregoing, etc., customized content(s), content associated with different users with permissions from the users, etc. In some implementations, the storage device 210 stores animation frames that present customized content(s) to users as animations. The storage device 210 may store other data for providing the acts and/or functionality described herein. In some implementations, the storage device 210 embodies the storage device 123 and/or the local storage on user device 115. The storage device 210 may also store a product catalog and/or a multiplicity of product records. The product records may include product information such as price information, margin information, inventory information, specifications, photographs and videos, user reviews, etc. In a further example, the storage device 210 may store unique customer types and contents in association with one or more of the different customer types, which may be used to generate customized content(s), as discussed elsewhere herein.

The bus 220 can include a communication bus for transferring data between the components (202, 204, 206, 208, 210, 212, etc.) of the computing device 200 or between computing devices, a network bus system including the network 105 or portions thereof, a processor mesh, a combination thereof, etc. In some implementations, the navigation application 103, the communication module 302, the user identification module 304, the content customization module 306, the frame generation module 308, the presentation module 310, and/or the user interface module 312 may cooperate and communicate via a software communication mechanism implemented in association with the bus 220. The software communication mechanism can include and/or facilitate, for example, secure and/or unsecure inter-process communication, local function or procedure calls, remote procedure calls, an object broker, direct socket communication among software modules, UDP broadcasts and receipts, HTTP connections, etc.

Figure 3:
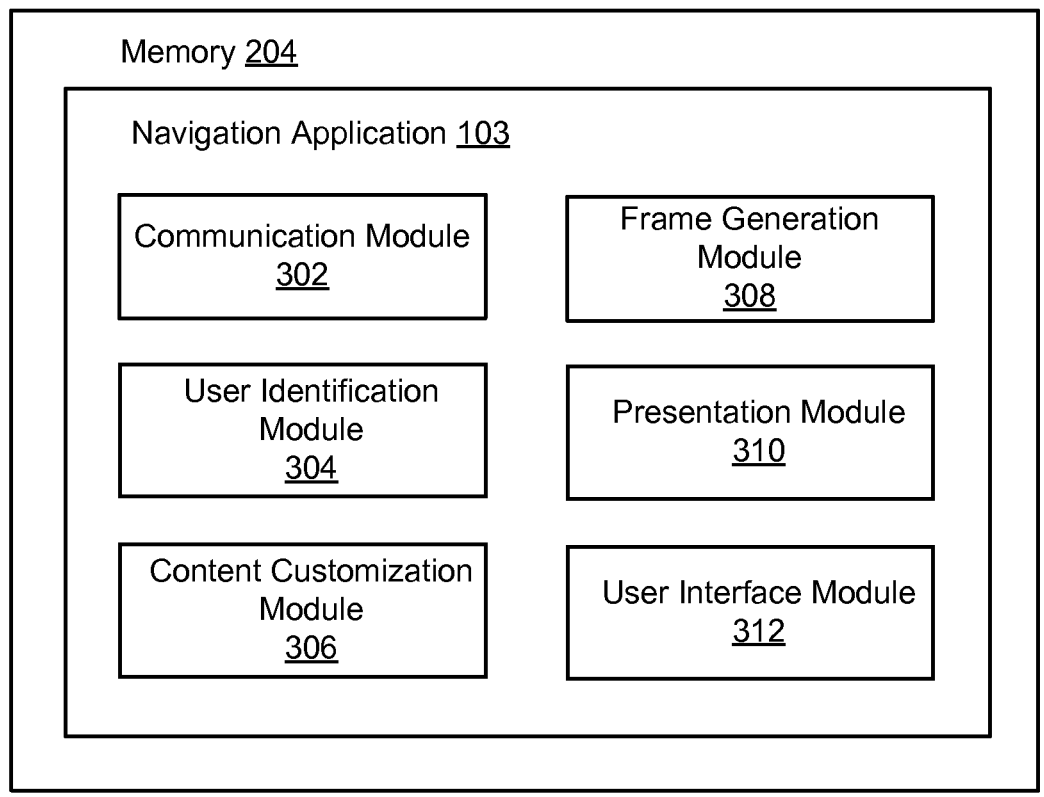
FIG. 3 is a block diagram illustrating a memory storing an example navigation application according to some implementations.

Referring to FIG. 3, the navigation application 103 stored in the memory 204 includes a communication module 302, a user identification module 304, a content customization module 306, a frame generation module 308, a presentation module 310, and a user interface module 312 according to some implementations. These components of the navigation application 103 are communicatively coupled to each other via the bus 220.

In some implementations, each of the communication module 302, the user identification module 304, the content customization module 306, the frame generation module 308, the presentation module 310 and the user interface module 312 can include a set of instructions executable by the processor 202 to provide the acts and/or functionality described herein. In some further implementations, each of the communication module 302, the user identification module 304, the content customization module 306, the frame generation module 308, the presentation module 310, and the user interface module 312 can be stored in the memory 204 of the computing device 200 and can be accessible and executable by the processor 202. The components of the navigation application 103 may be adapted for cooperation and communication with the processor 202 and other components of the computing device 200 via the bus 220.

The communication module 302 can be software including routines for handling communications between the navigation application 103 and other components of the computing device 200, between the components of the navigation application 103, etc., when executed by the processor 204 of the computing device 200. The communication module 302 sends and receives data, at times via the communication unit 206, to and from other entities of the system 100. For example, the communication module 302 receives, via the communication unit 206, input data describing a user interaction with a dynamic screen (e.g., a click on an item, hovering over an item using a mouse, selection of an item using a touchscreen or voice command, etc.) from a user device 115, and sends the input data to one or more of the content customization module 306, the frame generation module 308 and the presentation module 310. In some implementations, the communication module 302 handles communications between components of the navigation application 103. For example, the communication module 302 receives customized content(s) for a user from the content customization module 306 and sends the customized content(s) to other components of the system 100, such as the frame generation module 308, the presentation module 310, etc. As a further example, the communication module 302 receives, via the input/output device(s) 108, input data (e.g., interaction data) input by the user and routes that data to the appropriate components of the navigation application 103. In further implementations, two or more of the discrete components of the navigation application 103 may independently exchange data.

In some implementations, the communication module 302 receives data from components of the navigation application 103 and stores the data in the storage device 210. For example, the communication module 302 receives customized content(s) for a user from the content customization module 306 and stores the customized content(s) in the storage device 210. In some implementations, the communication module 302 retrieves data from the storage device 210 and sends the data to components of the navigation application 103. For example, the communication module 302 retrieves data content from the storage device 210 and provides the content to the content customization module 306, frame generation module 308, and/or presentation module 310, etc., as discussed elsewhere herein. In further implementations, the discrete components of the navigation application 103 may independently store and/or retrieve data in the storage device 210.

The user identification module 304 can be software including routines for identifying a user when executed by the processor 202. The user identification module 304 receives, via the communication module 302, data indicating a user visits/accesses a site from/on a user device 115. For example, the user identification module 304 receives data indicating that a user opens a web page hosted by the web server 101 via a browser stored on and executable by the user device 115. In another example, the user identification module 304 receives data indicating that a user launched an app stored on and executable by the user device 115, which is configured to exchange data with the web server 101 and/or the third-party server 113. Other variations are also possible and contemplated.

In some implementations, the user logs into the site using his or her registered account. The user identification module 304 identifies the user based on the log-in account. For example, the user identification module 304 retrieves a user profile associated with the log-in account from the storage 210 and identifies a user name, a user identifier (ID), an email address, a list of user devices associated with the user, information identifying whether the user is affiliated with a business, a membership ID, interests, demographic information, interaction data describing historical user activities, a purchase history, etc., associated with the user from the user profile. As a further example, the user identification module 304 may determine a given user associated with a given user device to be associated with a registered user account and then determine the customer type for the user of the user device based on user profile data of the user associated with the registered user account, although numerous other variations are also possible, as discussed in further detail elsewhere herein.

The user identification module 304 may identify user activities associated with the user. For example, the user identification module 304 retrieves from the storage 210 historical user activities performed by the identified user on the site. Example user activities performed on a site include, but are not limited to, viewing a photo such as a product photo, watching a video, reading description for a product, purchasing a product, ordering a service, clicking on/selecting an item such as a menu or a product, logging into a user account, logging out from a user account, sharing an item, posting a comment, connecting to customer service, etc. Other example user activities are possible.

In some other implementations, the user may navigate through the site anonymously (e.g., as a guest). For example, the user identification module 304 identifies the user as an anonymous user, and the content customization module 306 may generate customized content(s) based on an estimation of who the user is (e.g., based on data that implicitly identifies the user) or may generate standard content for the anonymous user without any customization or personalization.

In some implementations, the user identification module 304 determines identifying information explicitly and/or implicitly identifying the user based on user-related data, such as a third-party tracking information (e.g., cookie(s)), device-related information, location data, etc. For instance, the user identification module 304 may identify an IP address and/or a hardware address associated with the user device 115 (e.g., with permission from the user).

The user identification module 304 may characterize the user based on device-related information (e.g., the IP address and/or the hardware address associated with the user device 115). For instance, the user identification module 304 may determine a guest user as being a business user because the guest user is accessing the site via a personal computer (e.g., desktop) (as reflected by the hardware address and/or header data from the data request). The user identification module may further determine that the guest user is accessing the site during normal business hours (e.g., 2 PM) to further confirm the determination that the guest user is a business user. In another example, the user identification module 304 may determine the guest user as being a consumer user because the guest user accessing the site on a mobile computing device (e.g., a smartphone or tablet). The user identification module 304 may further determine that the guest user is accessing the site after normal business hours (e.g., 2 PM) to further confirm the determination that the guest user is a consumer user. The user identification module 304 may perform the same operations to characterize a registered user, for instance, to determine whether the registered user is acting in a business or personal capacity. This is advantageous as the layout and/or content of the site may be customized to the user based on the user's role in visiting the site, thereby increasing the probability of a purchase and/or additional purchases by the user.

In further implementations, the user identification module 304 may identify whether the user is a registered or otherwise known user based on the device-related information associated with the user device 115. For example, the user identification module 304 retrieves a user profile associated with the device-related information from the storage 210, and identifies the user using the user profile. The identification module 304 may identify user activities on the site based on the device-related information. For example, the identification module 304 may retrieve historical user activities associated with the device-related information from the storage 210.

In some implementations, the user identification module 304 determines a current location associated with the user, for instance with permission from the user. For example, assume a user has implicitly or explicitly registered his or her office computer and home computer with the site. The user identification module 304 can determine whether the user is in office or at home based on whether the user is using the office computer or home computer to visit the site. In another example, the user identification module 304 receives geolocation data (e.g., GPS data, etc.) from a sensor (e.g., GPS sensor, etc.) coupled to a user device 115 or a location-aware (e.g., GPS, operating system, etc.) application stored on the user device 115, and determines the location of the user device 115 based on the geolocation data. In yet another example, the user identification module 304 determines an approximate geo-location of the user based on an IP address associated with the user device 115, signaling information transmitted between the user device 115 and a cellular network, or other location-related data. In a further example, the user identification module 304 can cross-reference the IP address with other information sources, such as internet server provider databases, internet registries, etc. to determine the geographic location.

The user identification module 304 sends one or more of the user-related data, such as the customer/user type, the registration status (e.g., indicating whether the user is a registered user), the user profile, the user activities, the current location, etc., associated with the user to the content customization module 306. In some implementations, the user identification module 304 stores the user-related data, such as the user type, the registration status (e.g., indicating whether the user is a registered user), the user profile, the user activities, the current location, etc., in the storage 210.

The content customization module 306 can be software including routines executable by the processor 202 to customize content to users of the site. The content customization module 306 receives user-related data, such as the user type, the registration status (e.g., indicating whether the user is a registered user), the user profile, the user activities, the current location, etc., associated with a given user from the user identification module 304 and/or the storage 210.

In some implementations, the content customization module 306 may receive content associated with a site visited by the user from one or more data sources. For example, the content customization module 306 may retrieve content associated with the site from the web server 101 and/or the third-party server 113 responsive to receiving data indicating that the user is loading the site via software (e.g., web browser, mobile app, etc.) operable by the user device 115. For instance, the instance of the navigation application 103 on the user device 115 may transmit an HTTP-based request for data associated with a landing page, product category, a product-page, a page element (menu), etc., which indicates the user's intent to access that information. In a further example, the content customization module 306 may retrieve content data describing one or more products from the web server 101. In some instances, the content customization module 306 may retrieve images depicting the one or more products from the web server 101 and/or the third-party server 113 to add rich image data to the descriptions of the products.

In some implementations, the content customization module 306 receives input data describing a user interaction on an item displayed on an interface from the user device 115, and retrieves content associated with the item from one or more data sources. For example, the content customization module 306 receives input data from a user device 115 indicating a user selected a product category on an interface, and retrieves content associated with the product category (e.g., description for different products, images for different products) from the memory 204, the storage 210, the web server 101, and/or the third-party server 113, etc.

The content customization module 306 customizes the content for the user based on the user-related data, such as one or more of the user type, the registration status (e.g., indicating whether the user is a registered user), the user profile, the user activities, the current location, etc. For example, assume a user activity describes the user purchased a particular desk on the site 5 months ago. If the user selects (e.g., clicks, taps, etc.) on a product category "furniture," the content customization module 306 generates customized content(s) for the user that includes accessories for/additional desks similar to the particular desk based on the user activity. In another example, assume a given user uses a mouse to hover over/taps to highlight, etc., the category "gifts". This given user's user profile indicates the user is between 20 years old and 30 years old. The content customization module 306 ranks all the available gifts based which gifts are the most popular among users between 20 years old and 30 years old, and creates customized content(s) for the user that includes one or more of the most popular gifts for users between 20 years old and 30 years old (e.g., in the form of a scrollable list of the gifts in order of their ranking, a rotating display of select gifts, a spotlight of a certain gift, etc.). The gifts may be stored as products in the storage 210 and/or another data source, such as the third-party server 113, and the content customization module 306 may access the product information therefrom and/or customize the product information and/or the look and feel (e.g., size, color, padding, margin, placement, border, scrollablility, number of items, etc.) of the container(s) for the product(s).

Figure 11A:
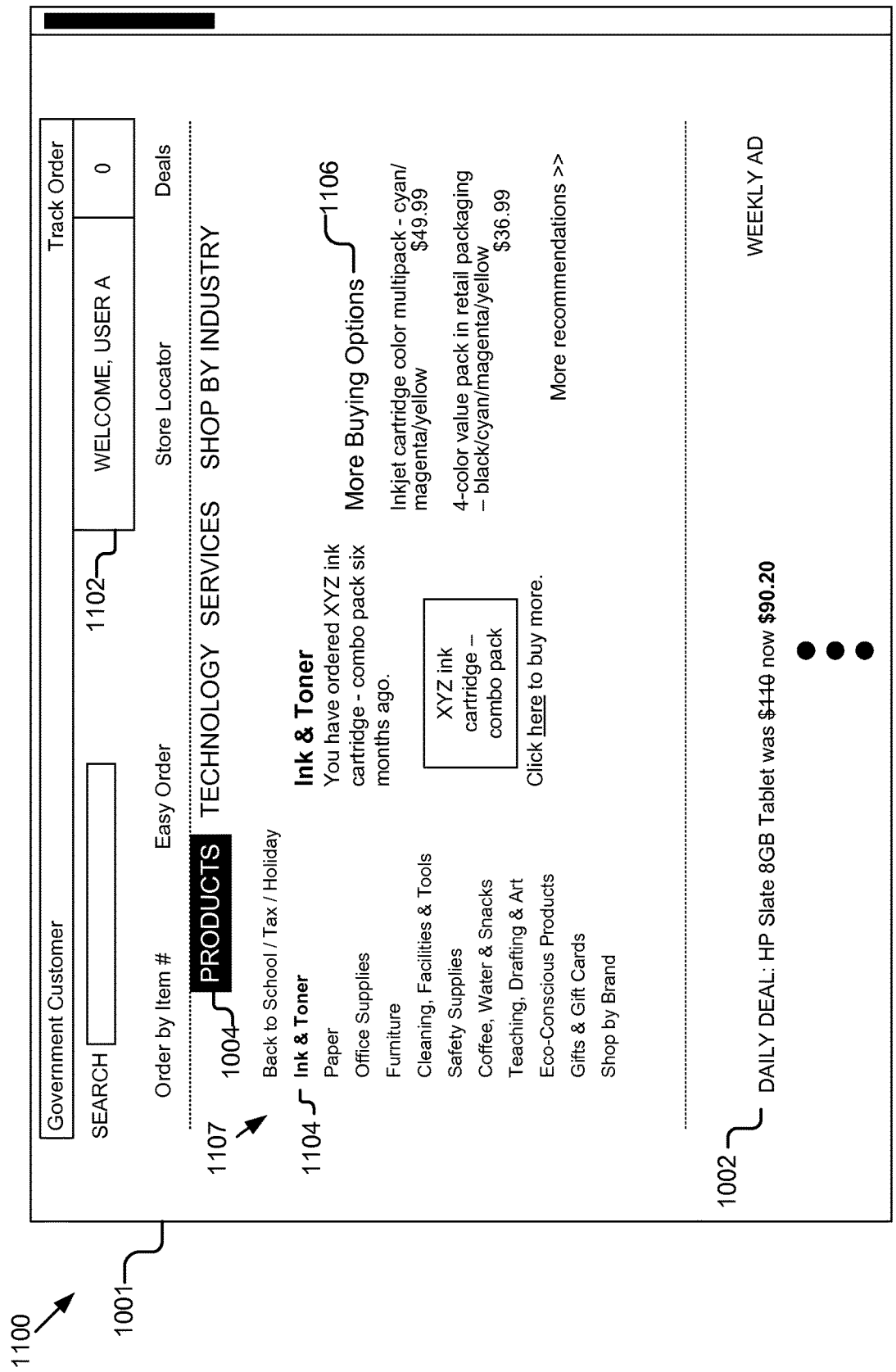
FIGS. 11A and 11B are graphic representations illustrating customized content(s) presented to users on a dynamic screen according to some implementations.
Figure 11B:
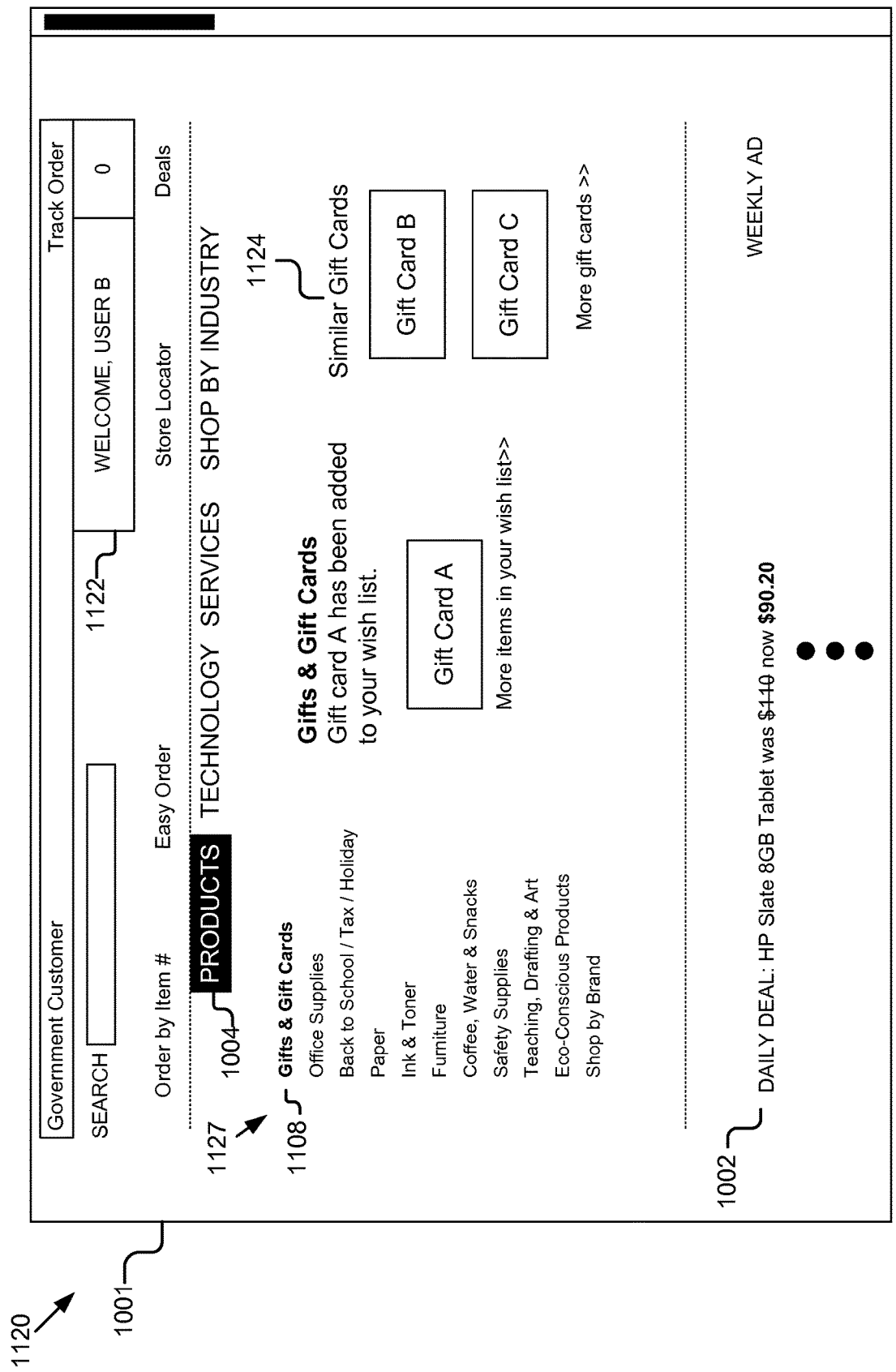

In yet another example, if the user is at home (e.g., the user visits the site using a computer at home) or accesses the site via a mobile computing device (e.g., the user visits the site using his/her smartphone or tablet), the content customization module 306 creates customized content(s) for the user based on the perceived personal interests of the user, such as content including furniture for homes, popular consumer devices, etc.; however, if the user is in the office (e.g., the user visits the site using an office computer (e.g., a desktop)), the content customization module 306 creates customized content(s) based on the perceived business interests of the user, including, for example, office supplies, office furniture, etc. In some examples, the customized content(s) for different users may include different products, different orders of the products, different highlighted products, and/or different formats to highlight the products as illustrated in FIGS. 11A and 11B, for instance. The products may be stored as products in the storage 210 and/or another data source, such as the third-party server 113, and the content customization module 306 may access the product information therefrom and/or customize the product information and/or the look and feel (e.g., size, color, padding, margin, placement, border, scrollablility, number of items, etc.) of the container(s) for the product(s).

In some implementations, the content customization module 306 may generate the customized content(s) for the user based on other/additional factors such as the season of the year, the month of the year, whether the day is a holiday, the time of the day, etc. For example, the customized content(s) for the user may include holiday items if it is 2 days before a holiday.

The content customization module 306 can send the customized content(s) to other components of the navigation application 103, such as the frame generation module 308, the presentation module 310, etc. In some implementations, the content customization module 306 stores and/or retrieves the customized content(s) in/from the storage 210.

The frame generation module 308 can be software including routines for generating one or more animation frames to form an animation when executed by the processor 202. The frame generation module 308 receives customized content(s) for a user from the content customization module 306 and/or the storage 210. The frame generation module 308 generates one or more animation frames that form an animation based on the customized content(s). For example, the frame generation module 308 generates an animation including a series of animation frames to illustrate motion of the customized content(s) on a dynamic screen. For example, the animation illustrates a dynamic appearance of the customized content(s) on the dynamic screen. In some implementations, the frame generation module 308 uses JavaScript or another suitable language to generate an animation including one or more animation frames.

In some examples, the animation illustrates a fly-in entrance of one or more first items displayed on a dynamic screen. The animation uses grows-and-shrinks effects to emphasize one or more second items on the dynamic screen. In some other examples, the animation illustrates an animated process showing how previously displayed content is pushed out from the dynamic screen and how the customized content(s) for the user appears on the dynamic screen. Further animations may include animating a toolbar to push content down, animating a custom header, animate elements the user frequently uses (e.g., search box, etc.), etc. Other example animations are possible.

In some implementations, an animation frame may include different customized content(s) from the same data source and/or different data sources. For example, an animation frame may include text data received from the web server 101 and/or the storage 210, and images received from the third-party server 113. In this example, the frame generation module 308 interlaces different customized content(s) from different data sources into one or more animation frames.

In some implementations, the frame generation module 308 also customizes the animation including one or more animation frames for the user based on user-related data including one or more of data reflecting the user's activities on the site, a user type, the registration status, the current location, other attributes from the user profile (e.g., age, gender, etc.), and/or other customization factors. For example, if the user profile indicates the user is a young and active user with age between 18 years old and 25 years old, the frame generation module 308 can increase the animation speed from 10 frames per second to 15 frames per second. In another example, if the user activities indicate that the user sometimes clicks on animations presented on a page, the frame generation module 308 can increase the time duration for the animation from 1 minute to 1.5 minutes; however, if the user activities indicate that the user usually ignores the animations, the frame generation module 308 can decrease the time duration for the animation from 1 minute to 0.5 minute. It should be understood that other examples to customize the animations are possible.

The presentation module 310 can be software including routines for presenting customized content(s) to users. Examples of customized content(s) may include customized products, customized menus, customized layouts and/or GUI element placement, customized text and/or images, customized colors, customized animations, etc., as discussed elsewhere herein. In a further example, the presentation module 310 receives animation frames associated with the interface item, an arrangement of a selection menu of the site customized to the user, a digital advertisement customized to the user, etc. For instance, an animation including a series of animation frames from the animation generation module 308, and presents the animation on the display 212 and/or delivers the animation to the user device 115 for display to the user. Continuing this example, the animation can be rendered at a speed of 15 frames per second. In some instances, the animation may last for 1 minute. In some other instances, the animation may last for 1.5 minute. In other examples, the animation may last for any pre-configured time duration.

In some implementations, the presentation module 310 receives data describing that a user visits a page or interacts via an input device 208 (e.g., a pointing device, software and/or hardware keyboard, video camera, microphone, etc.) with an item on a page presented for display on the user's user device 115. For example, the presentation module 310 receives data from the communication module 302 indicating a user has instructed a browser to load a web page or has launched a dedicated app stored on and operable by the user device 115 of the user. In another example, the communication module 302 or another module (e.g., the presentation module 310, the user interface module 312, etc.) receives interaction data describing a user interaction with an interface item of the site. For instance, a user is using a mouse to hover over a banner on a page or a touchscreen to tap to expand an advertisement on the page, etc. In response, the presentation module 310 receives custom content generated by the custom content module 306 and/or the frame generation module 308 and renders the custom content for display. For example, the presentation module 310 may provide the custom content to the user interface module 312 for display, e.g., in cooperation with the user interface module 312. In a further example, responsive to receiving the interaction data, the communication module 302 may instruct the frame generation module 308 to identify an animation including one or more animation frames associated with the item, and the presentation module 310 receives the animation from the frame generation module 308. In an example implementation, the presentation module 310 may deliver the animation including the one or more animation frames to the user interface module 312 operable by the user device 115, which causes the user device 115 to present the animation to the user.

In some implementations, the presentation module 310 caches the animation in the storage 210 for a specific time period, allowing the user to access the animation with a faster speed during that time period. In some other implementations, the presentation module 310 caches content and/or animations that are frequently accessed by users in the storage 210, allowing a faster access to the content and/or animations.

The user interface module 312 can be software including routines for generating graphical data for providing user interfaces to users when executed by the processor 202. The user interface module 312 may receive data from the other components of the navigation application 103 and/or the data storage 210 and render those contents for display, such as the presentation module 310. In some implementations, the user interface module 312 cooperates with and/or is included in other software operable by the user device 115, such an operating system, drivers, and/or a user application, such as a mobile app and/or web browser.

In some implementations, the user interface module 312 generates graphical data for providing a user interface that displays the customized content(s) to users. In an example, the user interface module 312 generates an interface presenting animation frames to users. In some implementations, the user interface module 312 may generate web pages and/or web data renderable by a user application operable by the user device 115 for display, such as a web browser. In a further example, the user interface module 312 sends the graphical data to the user device 115, causing the user device 115 to present the user interface to the user.

In an example, the user interface module 312 may be operable on the user device 115 to receive structured data from one or more components of a server-side instance of the navigation application 103, such as the frame generation module 308, the presentation module 310, and/or the frame generation module 308, etc. Examples of structured data may include XML, JSON, etc., although other suitable data formats are also contemplated. The user interface module 312 may generate graphical data based on the structured data.

Examples of the user interfaces generated by the user interface module 312 may include those discussed herein with reference to at least FIGS. 10A-11B, although it should be understood that the user interface module 312 may generate graphical data for providing other user interfaces to users.

Methods

The methods described herein are advantageous as they allows the navigation application 103 have a personalized experience across platforms, including mobile, desktop, etc. The navigation application 103 can effectively allow users to enjoy the same context from where they previously left off, as the data store 210 stores information reflecting that context and the navigation application 103 can regenerate it. In some implementations, the data store 210 reflects a sophisticated user attribute database. Using the previously stored attributes and attributes determined at runtime, the navigation application 103 can determine the identity of the user, either precise or to at least some degrees, and use that determination to customize the user's experience.

Figure 4:
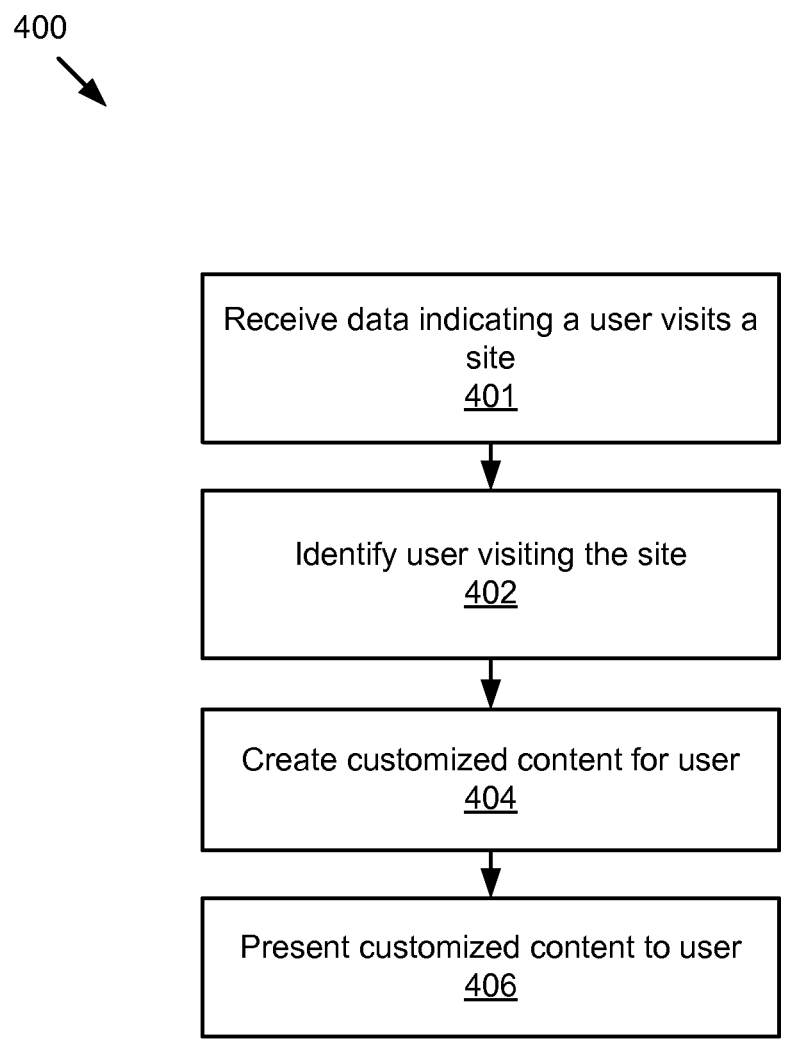
FIG. 4 is a flowchart of an example method for providing customized content(s) on a dynamic screen according to some implementations.

FIG. 4 is a flowchart of an example method 400 for providing customized content(s) for display via a dynamic screen according to some implementations. The communication module 302 receives 401 data indicating a user visits a site. In some examples, the communication module 302 receives data describing a user interaction on an item displayed on a page. The user identification module 304 identifies 402 the user visiting the site. An example method 402 for identifying a user is illustrated with reference to FIG. 5. The content customization module 306 creates 404 customized content(s) for the user. An example method 404 for creating customized content(s) for a user is illustrated with reference to FIG. 6. The presentation module 310 presents 406 the customized content(s) to the user. In an example, the presentation module presents 406 the customized content(s) using an animation on a dynamic screen. Continuing this example, the frame generation module 308 generates an animation including one or more animation frames based on the customized content(s), and the presentation module 310 delivers the animation to the user interface module 312 for presenting the animation to the user on a display of the user device 115 associated with the user. An example method 406 for presenting customized content(s) to a user using animation(s) is illustrated with reference to FIG. 7.

Figure 5:
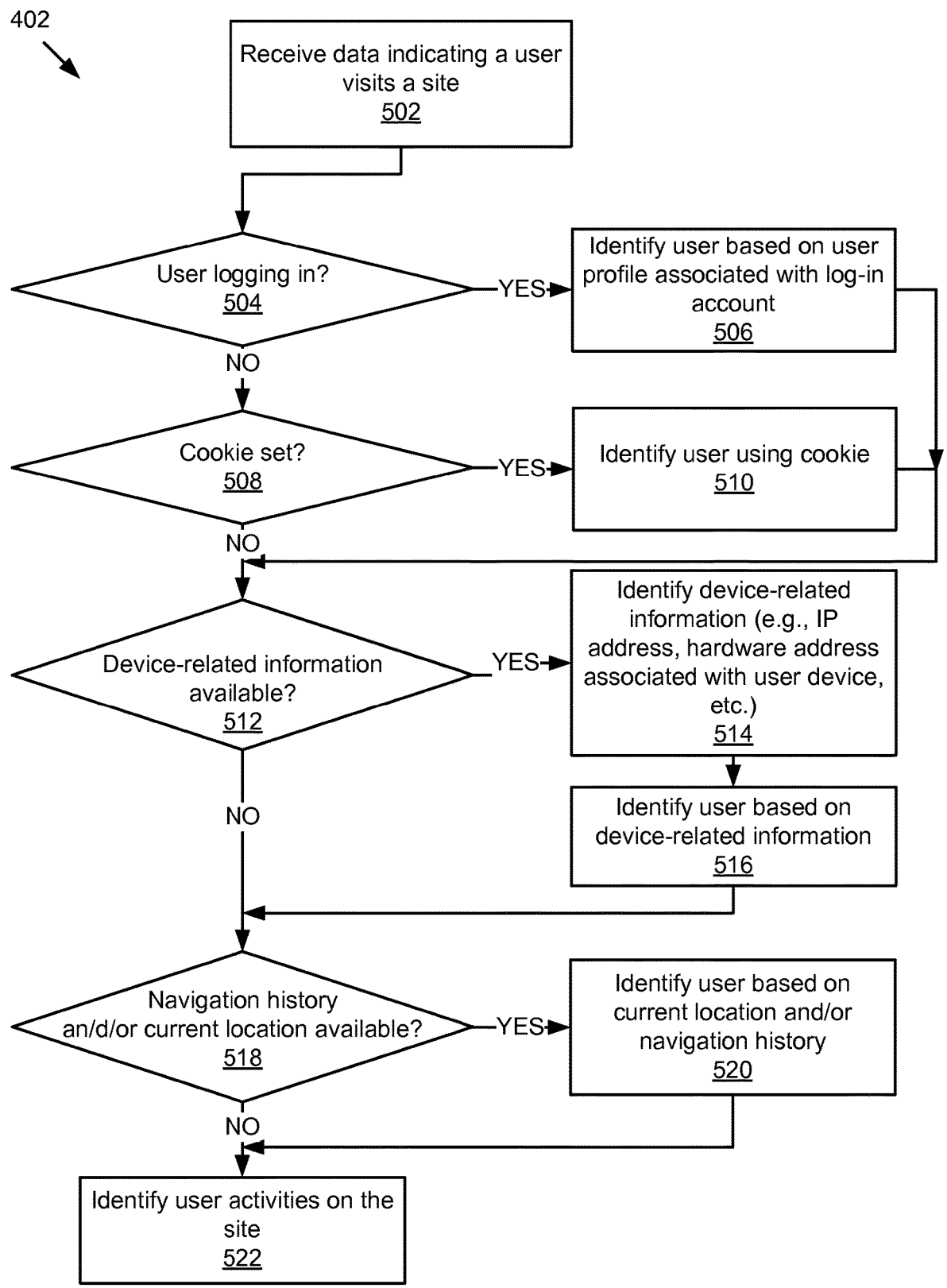
FIG. 5 is a flowchart of an example method for identifying a user that visits a site according to some implementations.

FIG. 5 is a flowchart of an example method 402 for identifying a user that visits/accesses a site according to some implementations. The communication module 302 receives 502 data indicating a user visits a site from a user device 115. The user identification module 304 determines 504 whether the user is logging into the site. If the user is logging in, the method 402 moves to block 506 and the user identification module 304 identifies the user based on the user profile associated with the log-in account. For instance, when identifying the user, the user identification module 304 may match identifying information associated with the user (e.g., user credentials) with user profile associated with the user's registered account/log-in account. In some implementations, the user identification module 304 interacts with a federated identity authentication service for authenticating users. The service may be operable by the web server 101 or the third-party server 113. In some implementations, the user identification module 304 may independently authorize user access based on a matching user account stored in the storage 210. The user identification module 304 may provide an authentication token authorizing such access, which can be referenced to determine whether the user is still authenticated.

If the user is not logging in block 504, the method 402 moves to block 508. In block 508, the user identification module 304 determines whether a cookie associated with the users identity has been set (e.g., during a prior usage session, by a third-party user activity tracker, etc.). If a cookie has been set, user identification module 304 identifies 510 the user using the cookie. If not, the method proceeds to block 512.

At block 512, user identification module 304 determines whether device-related information is available. If such information is available, the user identification module 304 identifies 514 the device-related information, such as an IP address, a hardware ID (e.g., a hardware address), etc., associated with the user device 115. The user identification module 304 identifies 516 the user based on the device-related information, and the method 402 moves to block 518. In some implementations, the user identification module 304 may identify the user by determining the specific identity and/or may identify the user more generally by identifying a type of user the user is. For instance, the user identification module 304 may identify the user as being a consumer user or a business user, as discussed elsewhere herein, although other user types are also applicable and contemplated.

At block 518, the user identification module 304 determines if a navigation history and/or current location of the user is available. If so, the user identification module 304 identifies the user based on the current location and/or the navigation history at 520. In some implementations, the user's navigation history on the site and/or other sites may be tracked based on unique device-related information, as discussed elsewhere herein, and the user identification module 304 may utilize that information to determine the identity of the user and/or characterize the user as being a certain type of user (e.g., belonging to a certain demographic, being associated with a certain business or organization, etc.). In some instances, the navigation history may reflect which links the user has traversed (e.g., email, banner add, social network, etc.), which may be used to show relevant content that is relevant to the user now.

In further implementations, the user identification module 304 may utilize the current location of the user to determine the identity of the user, as discussed elsewhere herein. In some examples, the user identification module 304 may utilize both the current location and the navigation history to determine and/or characterize the identity of the user. For example, the current location of the user's user device 115 may indicate that the user is at home and the navigation history may indicate that the user has repeatedly searched for certain types of consumer products. As such, the user identification module 304 may determine that the user should be considered a consumer user for that session. In a further example, as a user's location changes to a work location and the navigation history includes products related to work or business, the user identification module 304 may then determine that the user should be considered a business user.

In another example, if the user's current location corresponds to an address of a competitor's store, the user identification module 304 may identify the user as being user interested in goods carried by that store and the content customization module 306 may generate customized content(s) based on goods carried by that store. For example, the content customization module 306 may retrieve pricing information for the goods carried by that store and offer products that are the same or similar to those goods for prices lower than the goods carried by the competitor to incentivize user to purchase goods via the site instead of from the competitor store. Numerous other variations are also possible and contemplated.

Next, the user identification module identifies user activities performed by the identified user on the site at 522.

Figure 6:
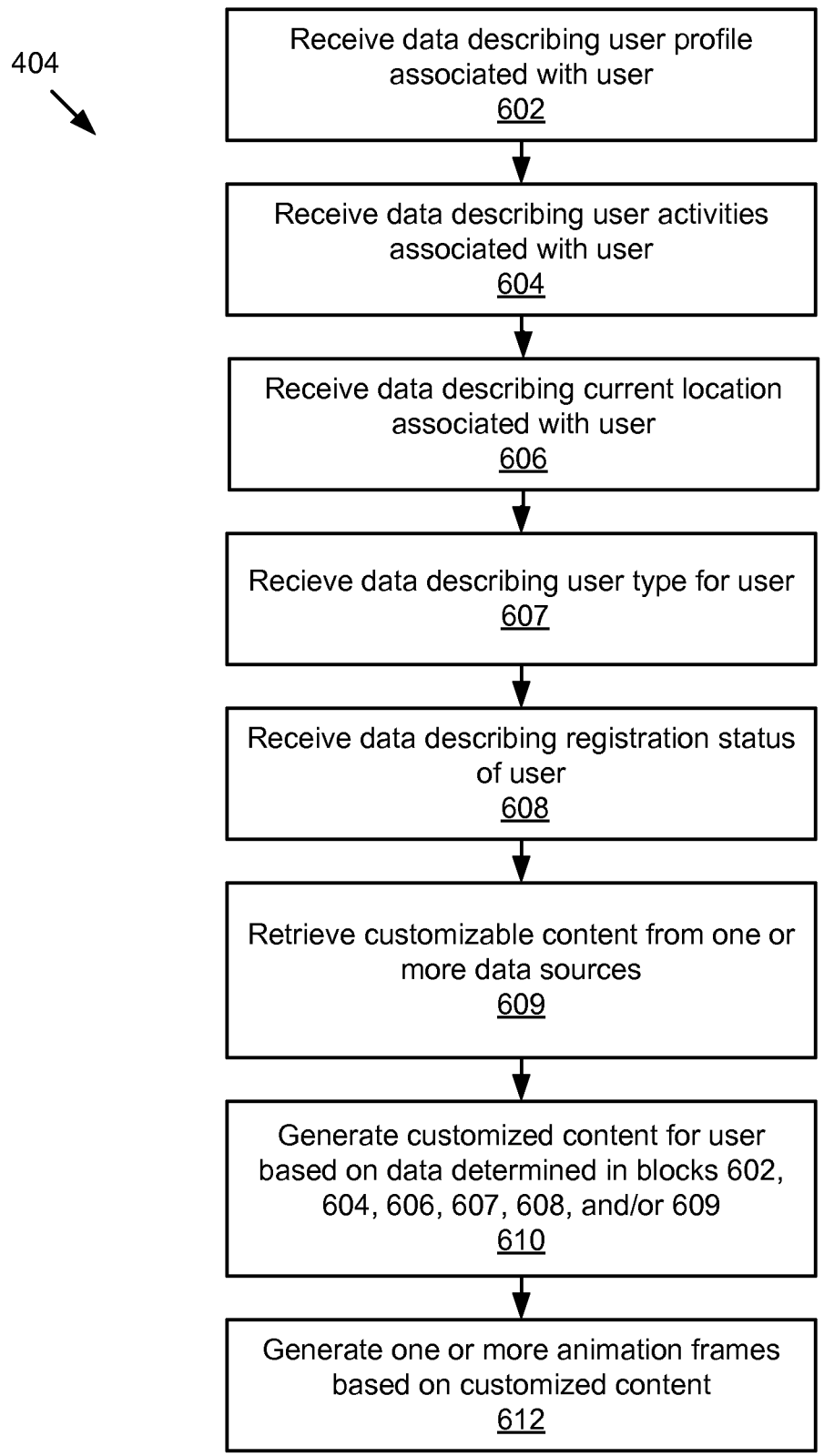
FIG. 6 is a flowchart of an example method for creating customized content(s) for a user according to some implementations.

FIG. 6 is a flowchart of an example method 404 for creating customized content(s) for a user according to some implementations. The content customization module 306 may receive 602 data describing a user profile associated with the user from the user identification module 304 and/or the storage 210. The content customization module 306 may receive 604 interaction data describing one or more user interactions (e.g., current activities and/or historical activities) associated with the user from the user identification module 304 and/or the storage 210. The content customization module 306 may receive 606 data describing a current location associated with the user from the user identification module 304 and/or the storage 210. The content customization module 306 may receive 607 data describing the user type for the user from the user identification module 304 and/or the storage 210. The content customization module 306 may receive 608 data describing the registration status of the user (e.g., whether the user is a registered user or a guest) from the user identification module 304 and/or the storage 210. The content customization module 306 may retrieve 609 customizable content from one or more data sources. For example, the content customization module 306 retrieves content associated with a page, content associated with items on a page and/or content associated with a site from the web server 101 and the third-party server 113.

The content customization module 306 generates 610 customized content(s) from the retrieved content for the user based on user-related data, such as on one or more of the user profile, the interaction data, the current location, the user type, the registration status, etc.

In an example, the content customization module 306 may generate custom page elements, such as menus, layouts, advertisements, product promotions, product containers, designs, etc., by generating and/or retrieving templates for these elements and populating them with corresponding information.

In an example, to generate a customized menu responsive to the user interacting with the page (e.g., selection of a menu element as reflected by interaction data), the content customization module 306 may determine whether the user is a consumer or business user based on one or more of the user's profile, the user type, the navigation history (e.g., websites the user has used in the past), and/or the user's current location, etc., and then dynamically determine a custom list of product categories to include in the menu element based on the whether the user is a consumer or business user. The content customization module 306 may additionally and/or alternatively adapt the category list based on the purchase history and/or navigation history of the user. For example, the purchase history stored in the storage 210 for the user may show the user has purchased products from certain categories in the past and/or has frequently browsed products from certain categories in the past (either on this site or other sites), the content customization module 306 may order the list to place these categories in the most prominent positions (e.g., at the top) and/or concatenate the list to initially only include categories determined to be the most relevant to the user. In some implementations, customized content(s) may be pre-generated and cached in the memory 204 on page load so when the user interacts with certain page element, they may be quickly rendered for display without noticeable lag, although other variations are also possible such as dynamic generation of the customized content(s). Further examples are discussed elsewhere herein.

In some implementations, the content customization module 306 may provide the customized content(s) to the presentation module 310 and/or the user interface module 312 for processing for display. In implementations where the customized content(s) are animated, the content customization module 306 may provide the content customized by it to the frame generation module 308, which may generate 612 one or more animation frames based on the customized content(s). The customized content(s) are presented to the user using animation(s) formed by the one or more animation frames, as discussed elsewhere herein.

Figure 7:
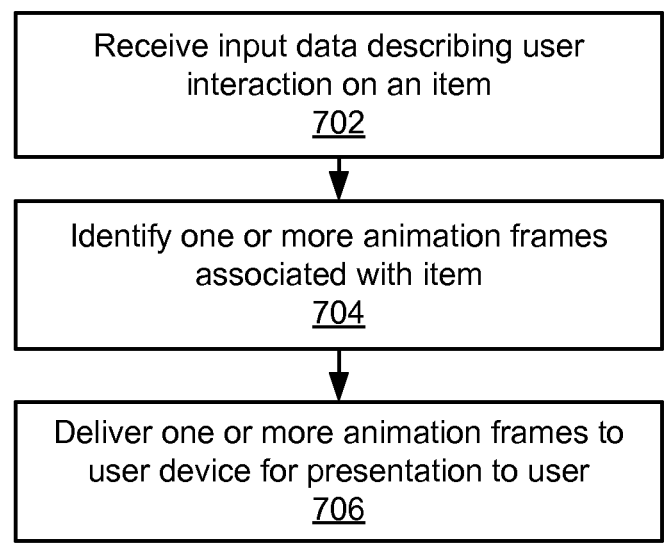
FIG. 7 is a flowchart of an example method for presenting customized content(s) to a user using animation(s) according to some implementations.

FIG. 7 is a flowchart of an example method 406 for presenting customized content(s) to a user using animation(s) according to some implementations. The communication module 302 receives 702 input data describing a user interaction on an item displayed on a page from a user device 115. For example, the communication module 302 receives data indicating the user clicks on the item. The frame generation module 308 identifies 704 one or more animation frames associated with the item. The presentation module 310 delivers 706 the one or more animation frames to the user interface module 312, which causes the user device 115 to present an animation formed by the one or more animation frames to the user.

Figure 8:
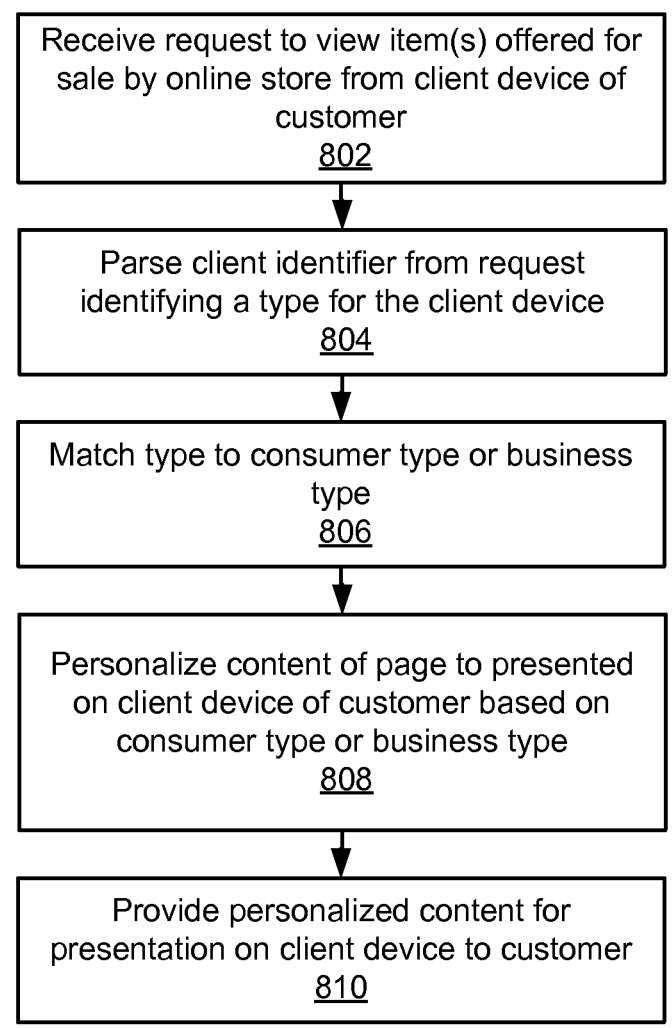
FIG. 8 is a flowchart of an example method customizing content based on the client device type according to some implementations.

FIG. 8 is a flowchart of an example method 800 for customizing content based on the client device type. In block 802, the communication module 302 receives a request to view item(s) offered for sale by an online store from a client device (e.g., user device 115) of a customer. The communication module 302 parses a client identifier from the request identifying a type for the client device at 804. The user identification module 304 matches the type of client device to a customer type or business type. For instance, as a further example, the user identification module 304 may determine a user device type for the user device based on information provided by the communication module 304 and then determine a customer type for the user based on the user device type, as discussed elsewhere herein. As a further example, client identifiers associated with mobile devices, such as smart phones and tablets, may be mapped to a consumer type in the storage 210 or as a predetermined variable stored in the memory 204, etc., and client identifiers associated with client devices that are not traditionally mobile (e.g., enterprise desktops), may be mapped to a business type in the storage 210 or as a predetermined variable stored in the memory 204, and the user identification module 304 may use the mappings to determine the customer type.

The content customization module 306 personalizes, at 808, content of the page to be presented on the client device of the customer based on the customer type or the business type determined in block 806. The presentation module 310, in conjunction with the user interface module 312, provides the personalized content for presentation on the client device to the customer at 810.

Figure 9:
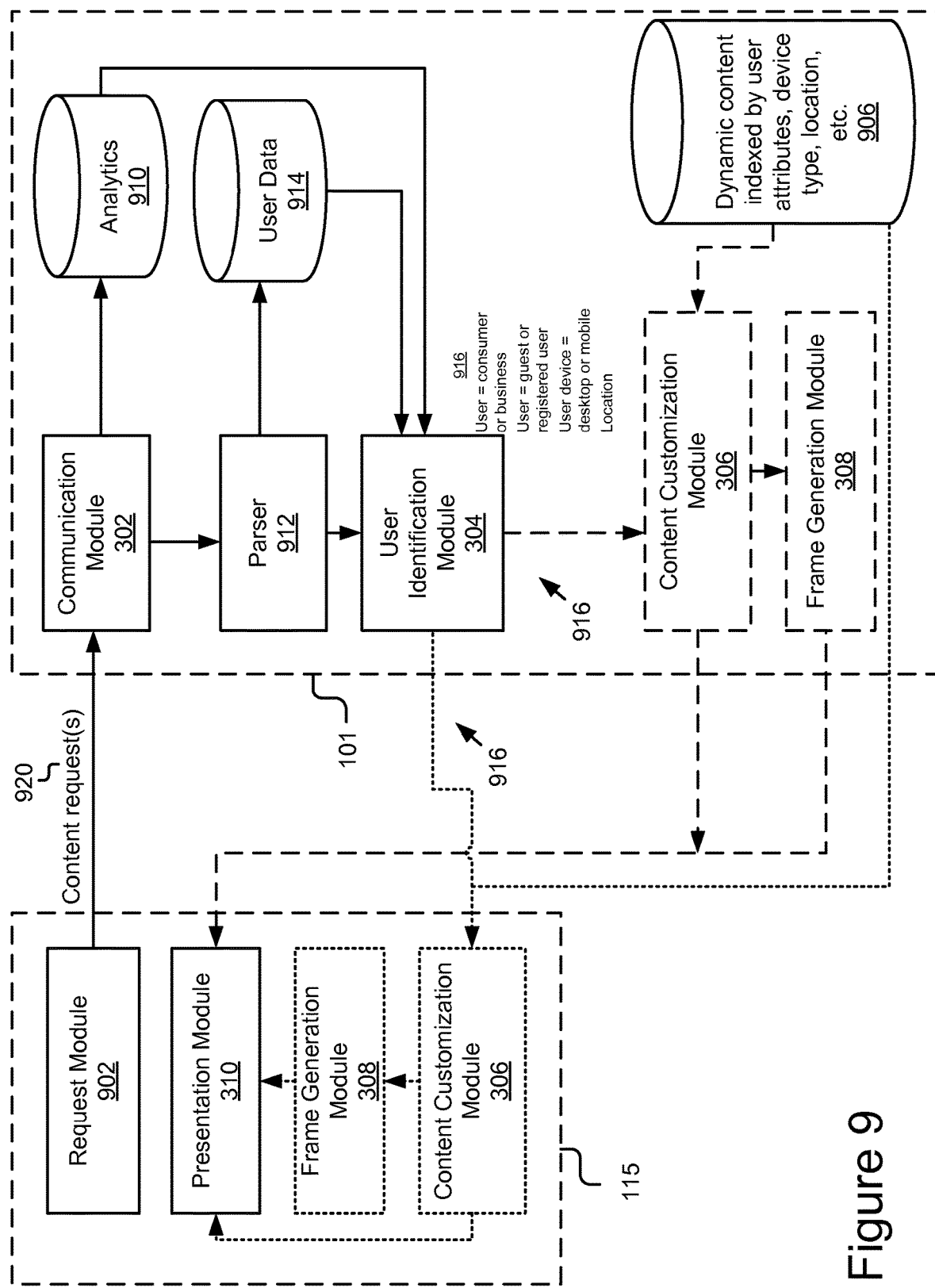
FIG. 9 is a data flow diagram illustrating example data flows between the components of the example system according to some implementations.

FIG. 9 is a data flow diagram illustrating example data flows between the components of the example system 100. As illustrated, the request module 902 may transmit request(s) for content 920 to the communication module 302. The communication module 302 may log the content request in an analytics database 910 to reflect/in association with the user's navigation history. The parser 912 may be a component included in the communication module 302, the user identification module 304, or may be separate therefrom but configured to interact with these components. The parser 912 may parse information from the content request(s) 920, such as device information, user application information, session information, cookie information, etc. As a further example, the parser 912 may parse an identifier identifying a type for the user device from the interaction data, as discussed elsewhere herein. The parser 912 may store the data parsed from the content request(s) in the data store depicted as user data 914, in association with a user profile of the user responsible for the content request(s). If the user cannot be exactly determined, the parser 912 may store the data parsed from the content request(s) in association with unique identifying information parsed from the content request(s), such as a unique device identifier (e.g., an IP address, a MAC address, etc.). Additionally and/or alternatively, the parser 912 may provide this information to the user identification module 304.

The user identification module may determine from this information various user-related data 916, such as user attributes, device attributes, location, etc., as discussed elsewhere herein. The user identification module 304 may provide the data 916 to the content customization module, which may use the data 916 to generate the customized content(s). Additionally and/or alternatively, the user identification module 304 may store the data determined thereby in the data store, such as the storage 210 for access by the user identification module and/or the other components. As a further example, the user identification module 304 may determine the customer type for the user of the user device by matching the identifier identifying the user device to one of a business customer type or a consumer customer type stored in the storage 210, as discussed elsewhere herein.

As illustrated in FIG. 9, the content customization module 306 and/or the frame generation module 308 may reside server-side and/or client-side depending on the configuration. For instance, the user identification module 304 may transmit the data 916 via the network 105 to the content customization module 306 included in the instance of the navigation application 103 stored on and operable by the client device 115. In another example, the user identification module may provide the data 916 to the content customization module included in the instance of the navigation application 103 stored and are operable by the web server 101. In addition, the storage 210, which includes the dynamic content 906 indexed by user attributes, device type, location, etc., may also reside client and/or server-side depending on the configuration. Regardless of whether the data retrieval operation from the storage 210 is a local operation or a network-based operation, the content customization module 306 may be configured to retrieve data 906 therefrom.

Similarly, the content customization module 306 and/or the frame generation module 308 and transmit content generated thereby via the network 101 to the presentation module 310, or may reside locally on the client device 115 and may receive any data from the web server 101 necessary to generate the customized content(s) and/or animation(s) and store and/or provide the data to the presentation module 310. Further acts and/or functionality of the content customization module 306, animation generation module 308, and the presentation module 310 are discussed in further detail herein in the description of these modules will not be repeated here.

Graphic Representations

Figure 10A:
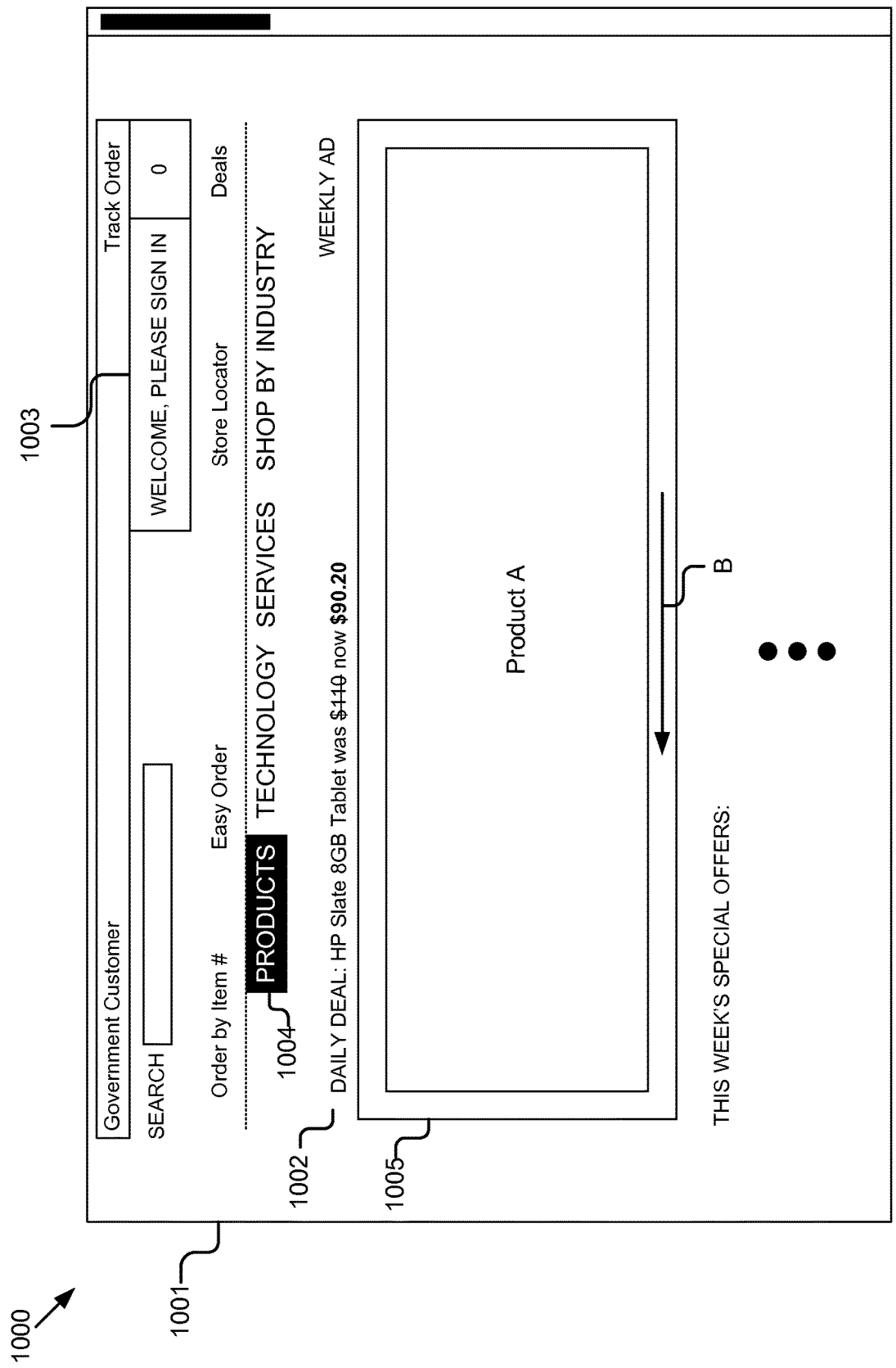
FIGS. 10A-10C are graphic representations illustrating an example animated navigation process on a dynamic screen according to some implementations.
Figure 10B:
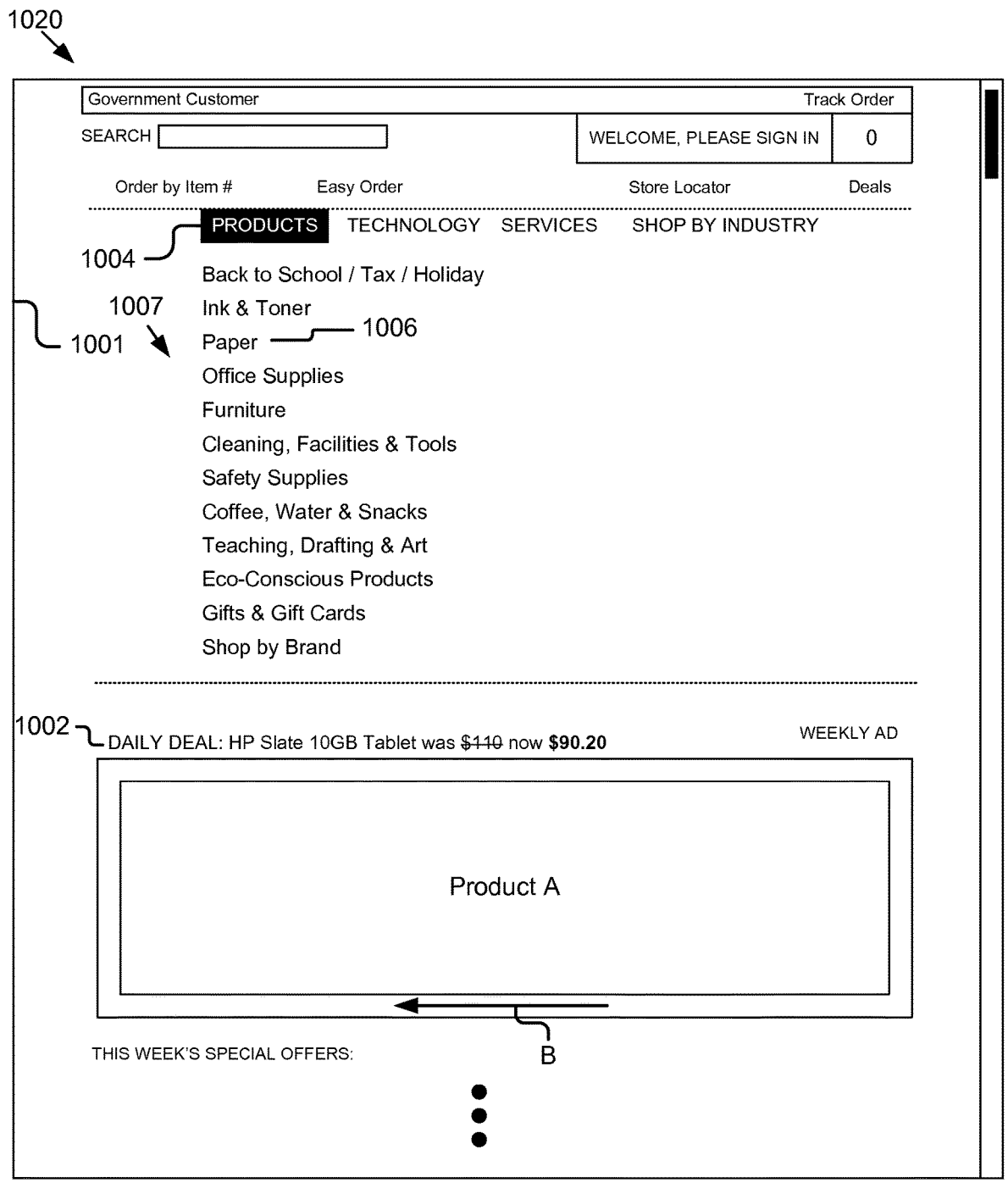
Figure 10C:
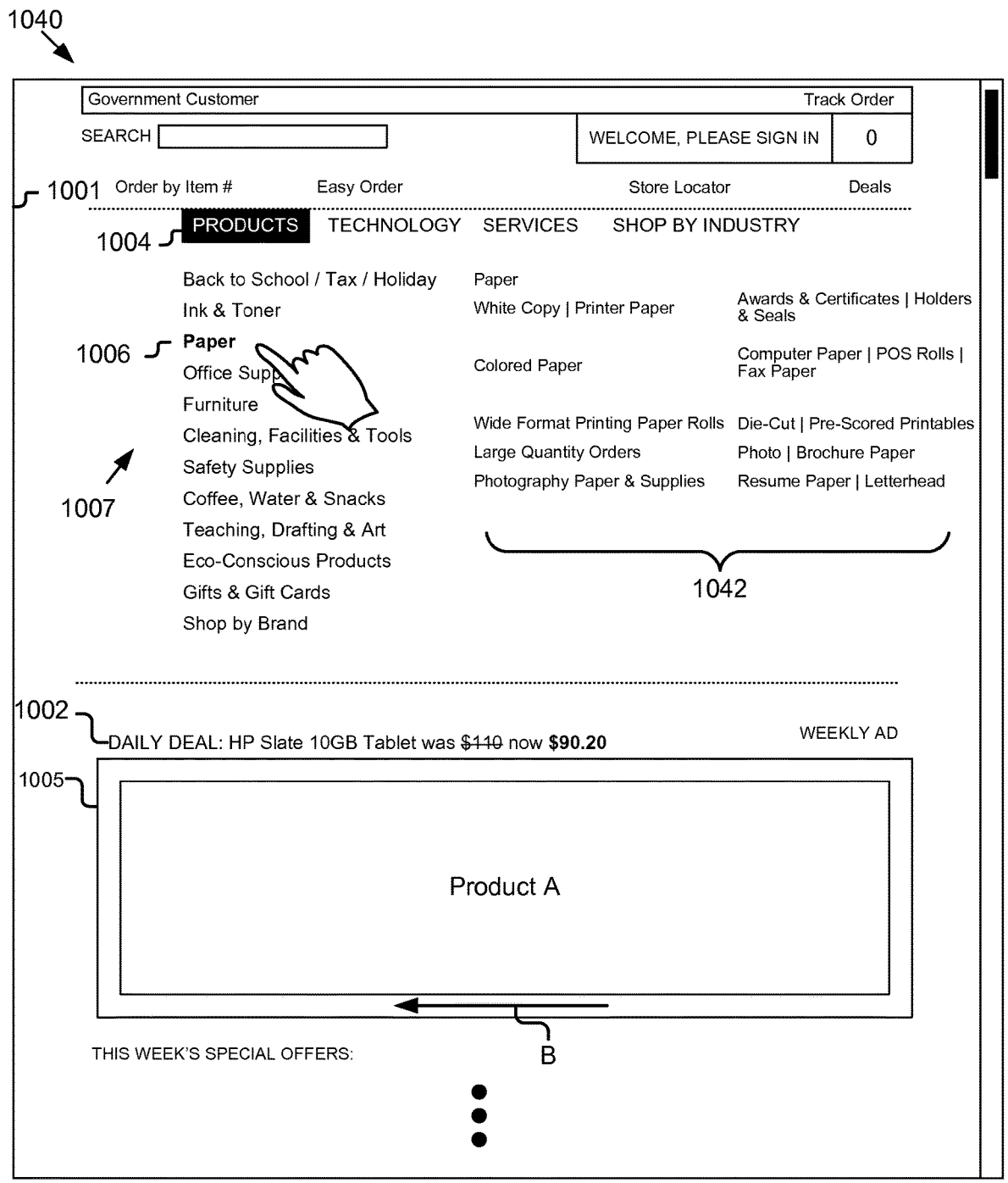

FIGS. 10A-10C are graphic representations 1000, 1020, and 1040 illustrating an example animated navigation process on a dynamic screen 1001 according to some implementations. Referring to FIG. 10A, a dynamic screen 1001 depicting a page is loaded on a web browser or mobile app. For example, the dynamic screen 1001 displays a daily deal 1002 displayed in association with a rotating set of products display in the banner field 1005. The products may automatically be rotated through in the banner field 1005 as indicated by the arrow B. The user, which in this example is considered a guest as shown in the login region 1003, can interact with any item displayed on the dynamic screen 1001. For example, if the user clicks on a "products" menu 1004, an animation associated with the menu 1004 is presented to the user. The animation illustrates an animated drop-down of products associated with the "products" menu 1004. Meanwhile, the drop-down of the products pushes the previous content (e.g., the daily deal 1002) away from the dynamic screen 1001. For example, the animation illustrates a dynamic process showing how the dynamic screen 1001 transits from FIG. 10A to FIG. 10B.

In FIG. 10B, content associated with the "products" menu 1004 is presented in the dynamic screen 1001, and the daily deal 1002 is pushed down. If the user clicks on a "paper" product 1006, an animation that illustrates a dynamic appearance of different paper products is played on the dynamic screen 1001. For example, the animation illustrates a transition of the dynamic screen 1001 from FIG. 10B to FIG. 10C. In FIG. 10C, different paper products 1042 are presented to the user. The product name "paper" is highlighted in red color for the user. Additionally and/or alternatively, the makeup of the products 1042, as well as any other of the elements of the dynamic screen 1001, such as the dropdown menu 1007, the toolbar including the products, technology, services, and shop by company selections, the advertisements being scrolled through, etc., may be customized to the user based on user attributes, user device attributes, location, etc., as discussed elsewhere herein.

FIGS. 11A and 11B are graphic representations 1100, 1120 illustrating customized content(s) presented to users on a dynamic screen 1001 according to some implementations. FIG. 11A illustrates products customized for User A 1102. In this example, User A is a registered or known user. For example, since User A has ordered XYZ ink cartridge-combo pack six months ago as reflected by the user activity stored for the user in the storage 210, the content customization module 306 spotlighted this product and highlighted the "Ink & Toner" 1104 product name for User A to make it convenient for User A to reorder the product. In addition, as shown, the drop down menu 1107 includes different categories of products as compared to the drop down menu 1007 in FIGS. 10A-10C, as it has been personalized to the user as discussed elsewhere herein. For instance, since the user purchased Ink & Toner in the past, the placement of the "Ink & Toner" in the menu is prioritized in the menu (e.g., in second place) next to "Back to School" since in this example school in starting soon and many users are interested in school-related products. As a further example, the drop down menu 1127 in FIG. 11B is customized based on the user and/or device-related information associated with User B. In this further example, the user has historically added items in his/her wishlist (which may be stored in the storage 210) and the content customization module 306 has customized and prioritized the menu based on the categories of items in that wish list (e.g., "Gifts and Gift Cards, Office Supplies, etc.) as well as seasonal influences, such as the time of year. Similarly, the dynamic screen 1001 includes recommendations 1106 associated with "Ink & Toner" for User A. FIG. 11B illustrates products customized for User B 1122. For example, since User B has added Gift Card A to the wish list, the "Gifts & Gift Cards" 1108 product name is highlighted for User B. The dynamic screen 1001 includes recommendations 1124 associated with "Gift & Gift Cards" for User B.

It should be understood that the user interfaces described in FIGS. 10A-11B are merely examples and that the interfaces generated by the system 100 could take a variety of different forms, be directed to different products and services, include different content, have different orientations, be optimized for different devices and screen resolutions, include different interactive elements, form fields, buttons, graphics, positions within the window, etc., all of which are encompassed by the scope of the present disclosure. For instance, different categories may be presented to the user, the menus could include different content options, the content could be configured for a horizontally scrollable interface (e.g., with a scrollbar/indicator located at the bottom) of the window, etc. Further, the interfaces could also include interactive options for the user to manually customize the form and type of content presented in the interfaces. In addition, numerous alternative and/or additional interfaces and interface configurations are contemplated and encompassed by the scope of this disclosure.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   storing unique customer types in a non-transitory computer storage device;
   storing, in the non-transitory computer storage device, contents in association with one or more of the unique customer types;
   receiving, at a user device or a server coupled to the user device, interaction data from the user device of a user describing an interaction by the user with a site presented for display to the user on the user device;
   determining, by the user device or the server, a customer type for the user;
   generating, by the user device or the server, one or more customized contents by matching the customer type associated with the interaction data to one or more of the contents stored in the non-transitory computer storage device;
   generating one or more graphical animations having a plurality of frames using the one or more customized contents;
   presenting the one or more customized contents to the user via the one or more graphical animations on a display of the user device; and
   adjusting a pre-configured time duration of the one or more graphical animations based on a degree to which the user interacts with the one or more graphical animations while the one or more graphical animations execute on the user device.

2. The computer-implemented method of claim 1, further comprising:
   parsing an identifier identifying a type for the user device from the interaction data; and
   determining the customer type for the user of the user device by matching the identifier identifying the user device to a business customer type or a consumer customer type stored in the non-transitory computer storage device.

3. The computer-implemented method of claim 1, further comprising:
   determining the user associated with the user device to be associated with a registered user account; and
   determining the customer type for the user of the user device based on user profile data of the user associated with the registered user account.

4. The computer-implemented method of claim 1, wherein the interaction data describes a user interaction with an interface item of the site.

5. The computer-implemented method of claim 4, wherein the one or more customized contents include one or more animation frames associated with the interface item.

6. The computer-implemented method of claim 4, wherein the one or more customized contents include an arrangement of a selection menu of the site customized to the user.

7. The computer-implemented method of claim 4, wherein the one or more customized contents include a digital advertisement customized to the user.

8. The computer-implemented method of claim 1, further comprising determining, by the user device or the server, a user device type for the user device, wherein the customer type for the user is based on the user device type.

9. The computer-implemented method of claim 1, further comprising:
   receiving, at the user device or the server, a user input selecting a menu graphical element;
   animating, by the user device or the server, a menu associated with the menu graphical element; and
   displacing, by the user device or the server, a graphical animation of the one or more graphical animations on the display of the user device based on the animation of the menu.

10. A computer system comprising:
    one or more processors; and
    one or more memories storing computer logic that, when executed by the one or more processors, cause the computer system to perform operations including:
       storing unique customer types in a non-transitory computer storage device;
       storing, in the non-transitory computer storage device, contents in association with one or more of the unique customer types;
       receiving interaction data from a user device of a user describing an interaction by the user with a site presented for display to the user on the user device;
       determining a customer type for the user;
       generating one or more customized contents by matching the customer type associated with the interaction data to one or more of the contents stored in the non-transitory computer storage device;
       generating a graphical animation having a plurality of frames using the one or more customized contents;
       presenting the one or more customized contents to the user via the graphical animation on a display of the user device; and adjusting a pre-configured time duration of the graphical animation based on a degree to which the user interacts with the graphical animation while the graphical animation executes on the user device.

11. The computer system of claim 10, wherein the computer logic, when executed by the one or more processors, cause the computer system to perform further operations including:
parsing an identifier identifying a type for the user device from the interaction data; and
determining the customer type for the user of the user device by matching the identifier identifying the user device to a business customer type or a consumer customer type stored in the non-transitory computer storage device.

12. The computer system of claim 10, wherein the computer logic, when executed by the one or more processors, cause the computer system to perform further operations including:
determining the user associated with the user device to be associated with a registered user account; and
determining the customer type for the user of the user device based on user profile data of the user associated with the registered user account.

13. The computer system of claim 10, wherein the interaction data describes a user interaction with an interface item of the site.

14. The computer system of claim 13, wherein the computer logic, wherein the one or more customized contents include one or more animation frames associated with the interface item.

15. The computer system of claim 13, wherein the one or more customized contents include an arrangement of a selection menu of the site customized to the user.

16. The computer system of claim 13, wherein the one or more customized contents include a digital advertisement customized to the user.

17. The computer system of claim 10, wherein the computer logic, when executed by the one or more processors, cause the computer system to perform further operations including determining, by the computer system, a user device type for the user device, wherein the customer type for the user is based on the user device type.

18. A system comprising:
a non-transitory computer storage device storing unique customer types and contents in association with one or more of the unique customer types;
means for receiving interaction data from a user device of a user describing an interaction by the user with a site presented for display to the user on a user device;
means for determining a customer type for the user, parsing an identifier identifying a type for the user device from the interaction data, and determining the customer type for the user of the user device by matching the identifier identifying the user device to a business customer type or a consumer customer type stored in the non-transitory computer storage device;
means for generating one or more customized contents by matching the customer type associated with the interaction data to one or more of the contents stored in the non-transitory computer storage device;
means for generating a graphical animation having a plurality of frames using the one or more customized contents;
means for presenting the one or more customized contents to the user via the graphical animation on a display of the user device;
means for adjusting a pre-configured time duration of the graphical animation based on a degree to which the user interacts with the graphical animation while the graphical animation executes on the user device; and
means for moving the graphical animation on a graphical interface of the display in response to a graphical element being selected.

19. A system comprising:
one or more processors;
one or more memories storing computer logic executable by the one or more processors;
a non-transitory computer storage device storing unique customer types and contents in association with one or more of the unique customer types;
a communication module executable by the one or more processors to receive interaction data from a user device of a user describing an interaction by the user with a site presented for display to the user on the user device;
a user identification module executable by the one or more processors to determine a customer type for the user;
a content customization module executable by the one or more processors to generate one or more customized contents by matching the customer type associated with the interaction data to one or more of the contents stored in the non-transitory computer storage device, the content customization module coupled to the communication module or the non-transitory computer storage device to receive the interaction data and coupled to the user identification module or the non-transitory computer storage device to receive the customer type;
a frame generation module executable by the one or more processors to generate a graphical animation having a plurality of frames using the one or more customized contents;
a presentation module executable by the one or more processors to present the one or more customized contents to the user via the graphical animation on a display of the user device; and
an adjusting module executable by the one or more processors to adjust a pre-configured time duration of the graphical animation based on a degree to which the user interacts with the graphical animation while the graphical animation executes on the user device.

* * * * *